(12) United States Patent
Kusayama

(10) Patent No.: US 7,900,534 B2
(45) Date of Patent: Mar. 8, 2011

(54) SHIFTER FOR VEHICLE TRANSMISSION

(75) Inventor: Takumi Kusayama, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 12/394,462

(22) Filed: Feb. 27, 2009

(65) Prior Publication Data
US 2009/0217781 A1 Sep. 3, 2009

(30) Foreign Application Priority Data

Feb. 28, 2008 (JP) .................................. 2008-47609

(51) Int. Cl.
*F16H 59/04* (2006.01)
*G05G 9/047* (2006.01)
(52) U.S. Cl. .................. 74/473.3; 74/473.34; 74/471 XY
(58) Field of Classification Search .................. 74/473.1, 74/473.14, 473.15, 473.25, 473.3, 473.33, 74/473.34, 473.35, 497
See application file for complete search history.

(56) References Cited

U.S. PATENT DOCUMENTS

| 3,679,846 A | 7/1972 | Dillon et al. |
| 4,630,500 A | 12/1986 | Suzuki |
| 5,410,931 A | 5/1995 | Pecceu |
| 5,560,253 A * | 10/1996 | Ishikawa et al. ............. 74/473.3 |
| 5,852,953 A * | 12/1998 | Ersoy ......................... 74/473.12 |

FOREIGN PATENT DOCUMENTS

| GB | 979574 | 1/1865 |
| JP | 9-226402 | 9/1997 |
| JP | 11-170883 | 6/1999 |

* cited by examiner

*Primary Examiner* — Thomas R Hannon
*Assistant Examiner* — Phillip A Johnson
(74) *Attorney, Agent, or Firm* — Gerald E. Hespos; Michal J. Porco

(57) ABSTRACT

A shifter for a vehicle transmission has a lever with a base end. A holder holds the base end of the lever rotatably in first and second perpendicular directions. A shaft is coupled to the base end of the lever. A shift-cable connection has a shaft insertion hole and is held swingably by the holder. The shift-cable connection is connectable with a shift cable connected to a transmission. The follower shaft has a distal end connectable with a selection cable connected to the transmission, and is inserted into the shaft insertion hole to allow the distal end to protrude therefrom. Thus, the shaft swings when the lever is tilted in the first direction to press an inner surface of the shaft insertion hole to swing the shift-cable connection, and moves inside and along the shaft insertion hole when the lever is tilted in the second direction.

7 Claims, 12 Drawing Sheets

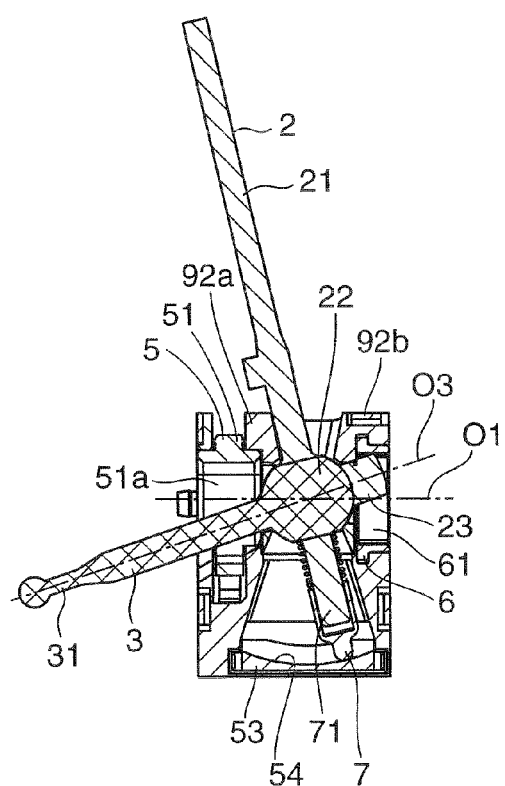
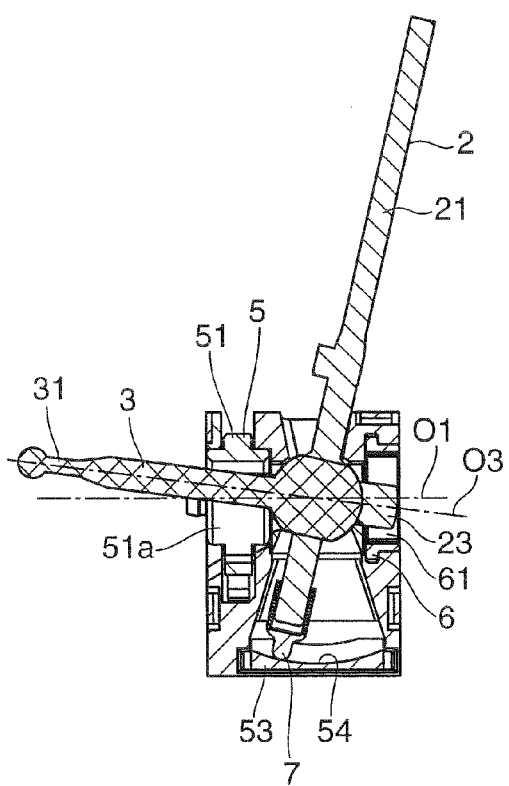

SHIFTER FOR VEHICLE TRANSMISSION

BACKGROUND OF THE INVENTION

1. Field of the Invention

The present invention relates to a shifter for a vehicle transmission.

2. Description of the Related Art

Heretofore, as a shifter for a vehicle transmission, there have been known two types: an automatic transmission (AT) shifter and a manual transmission (MT) shifter. As the automatic transmission shifter, there has been proposed a shifter designed to support a shift lever swingably about two axes orthogonal to each other, in such a manner as to allow a driver to manually move the shift lever in a first direction (shift direction) (e.g., a frontward-rearward (longitudinal) direction of a vehicle body in a state after the shifter is mounted to the vehicle body) and a second direction perpendicular to the first direction (selection direction) (e.g., a rightward-leftward (lateral) direction of the vehicle) so as to shift speed stages of an automatic transmission through a shift cable (see, for example, JP 11-170883A).

As the manual transmission shifter, there has been proposed a shifter designed to rotatably hold a spherical portion provided on a shift lever, in such a manner to allow a driver to manually move the shift lever in a shift direction and a selection direction to change a speed stage of a manual transmission through a shift cable and a selection cable (see, for example, JP 09-226402A).

The former shifter designed as the automatic transmission shifter cannot be used for a manual transmission, and the latter shifter designed as a manual transmission shifter cannot be used for an automatic transmission. That is, each of the two types of shifters is not designed to be usable both in a manual transmission and in an automatic transmission. Moreover, the two types of shifters are produced independently and separately.

SUMMARY OF THE INVENTION

It is therefore an object of the present invention to provide a shifter usable both in a manual transmission and in an automatic transmission. It is another object of the present invention to reduce a cost of a shifter.

In order to achieve the above objects, according to one aspect of the present invention, there is provided a shifter for use with a vehicle transmission, which comprises a shift lever having a base end, a holder section which holds the base end of the shift lever rotatably in first and second directions perpendicular to each other, a follower shaft coupled to the base end of the shift lever, and a shift-cable connection member formed with a slot-shaped shaft insertion hole and swingably held by the holder section. The shift-cable connection member is adapted to be connectable with a selected one of a shift cable connected to an automatic transmission and a shift cable connected to a manual transmission. In this shifter, the follower shaft is formed to have a distal end connectable with a selection cable connected to the manual transmission, and inserted into the shaft insertion hole to allow the distal end to protrude from the shaft insertion hole, in such a manner that the follower shaft is swingingly moved in conjunction with a tilt movement of the shift lever in the first direction to press an inner surface of the shift-cable connection member defining the shaft insertion hole so as to swingingly move the shift-cable connection member, and moved inside and along the shaft insertion hole in conjunction with a tilt movement of the shift lever in the second direction.

BRIEF DESCRIPTION OF THE DRAWINGS

FIG. 8A is an explanatory sectional view showing respective movements of a shift lever and a follower shaft of the shifter in case where the shifter is assembled as a manual transmission shifter, wherein the shift lever is tilted leftwardly from a neutral position.

FIG. 8B is an explanatory sectional view showing respective movements of the shift lever and the follower shaft of the shifter in case where the shifter is assembled as a manual transmission shifter, wherein the shift lever is tilted rightwardly from the neutral position.

DETAILED DESCRIPTION OF THE PREFERRED EMBODIMENTS

With reference to the drawings, the present invention will now be specifically described based on a preferred embodiment thereof. In the following description, directions, such as a frontward-rearward (longitudinal) direction (right, left), a rightward-leftward (lateral) direction (right, left), and an upward-downward direction (upper, lower), will be described based on a vehicle body of a vehicle with a right-hand steering wheel in a state after the shifter is mounted to the vehicle body, unless otherwise specified.

Figure 1:
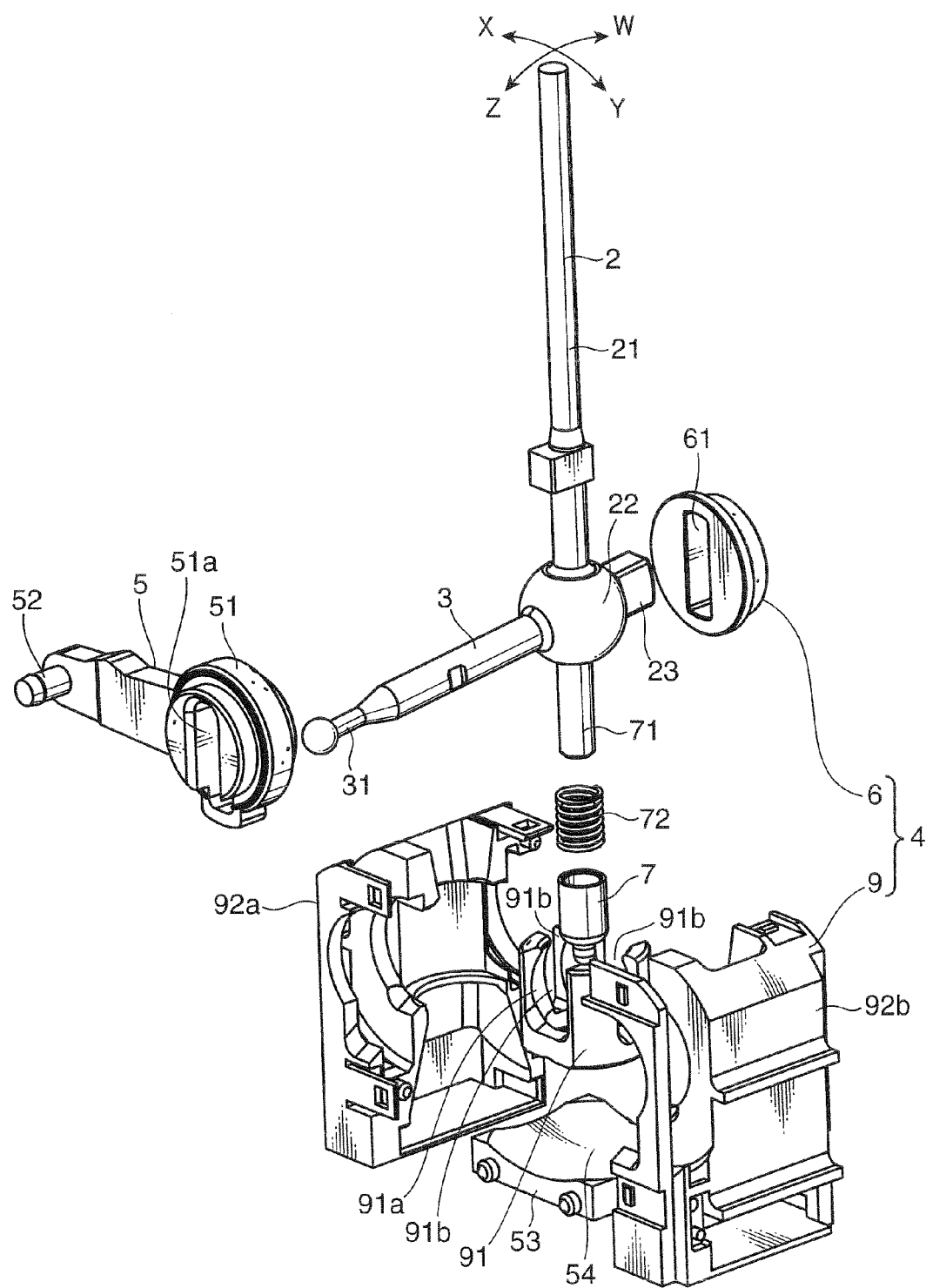
FIG. 1 is an exploded perspective view showing a shifter for a vehicle transmission, according to one embodiment of the present invention.
Figure 2:
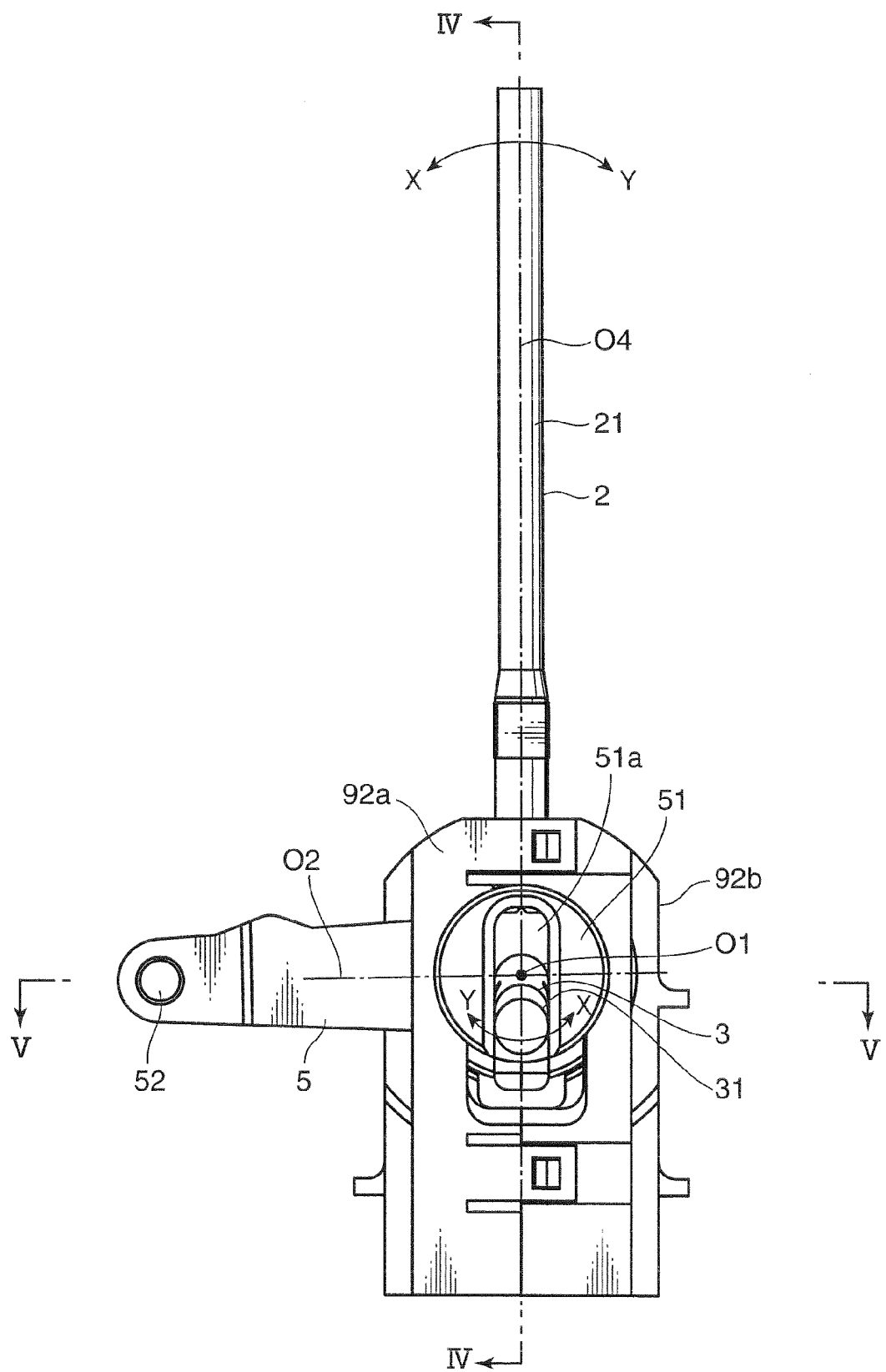
FIG. 2 is a side view of the shifter.
Figure 3:
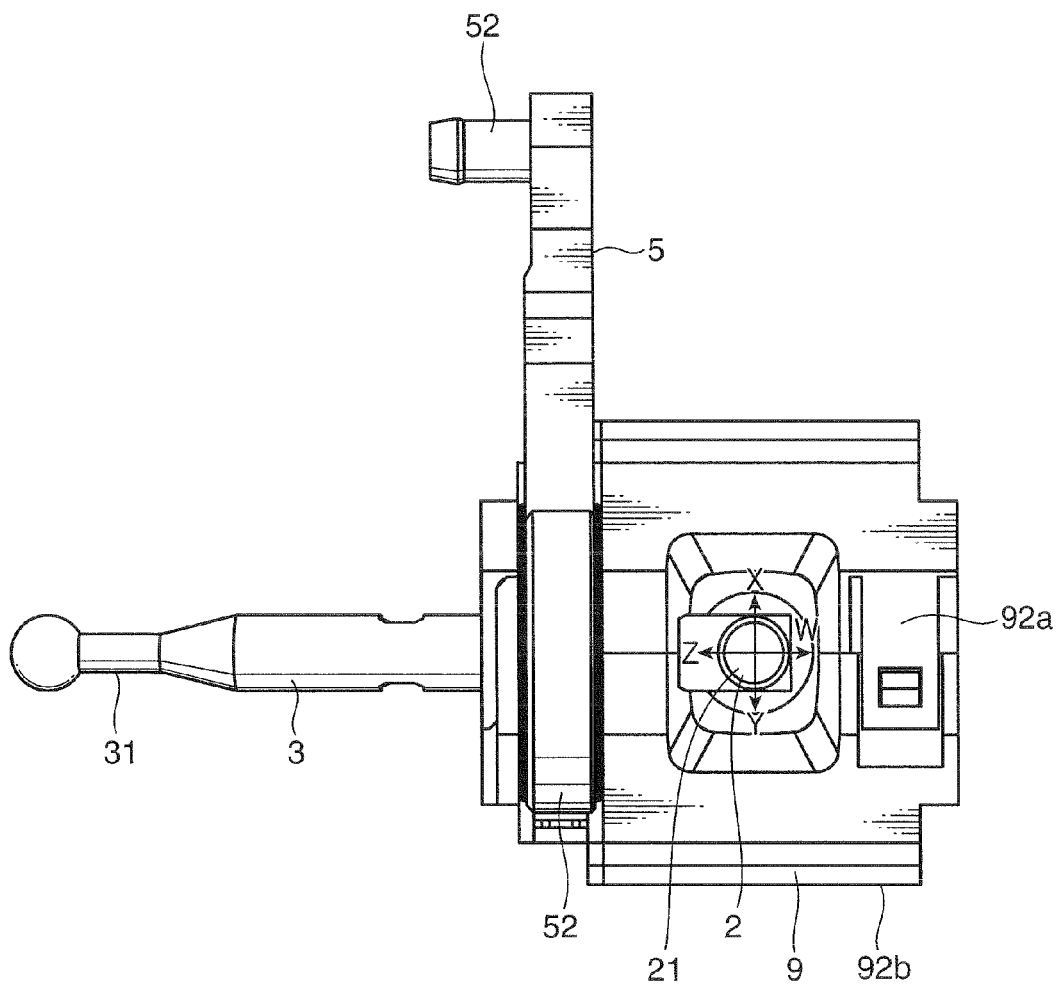
FIG. 3 is a top plan view of the shifter.
Figure 4:
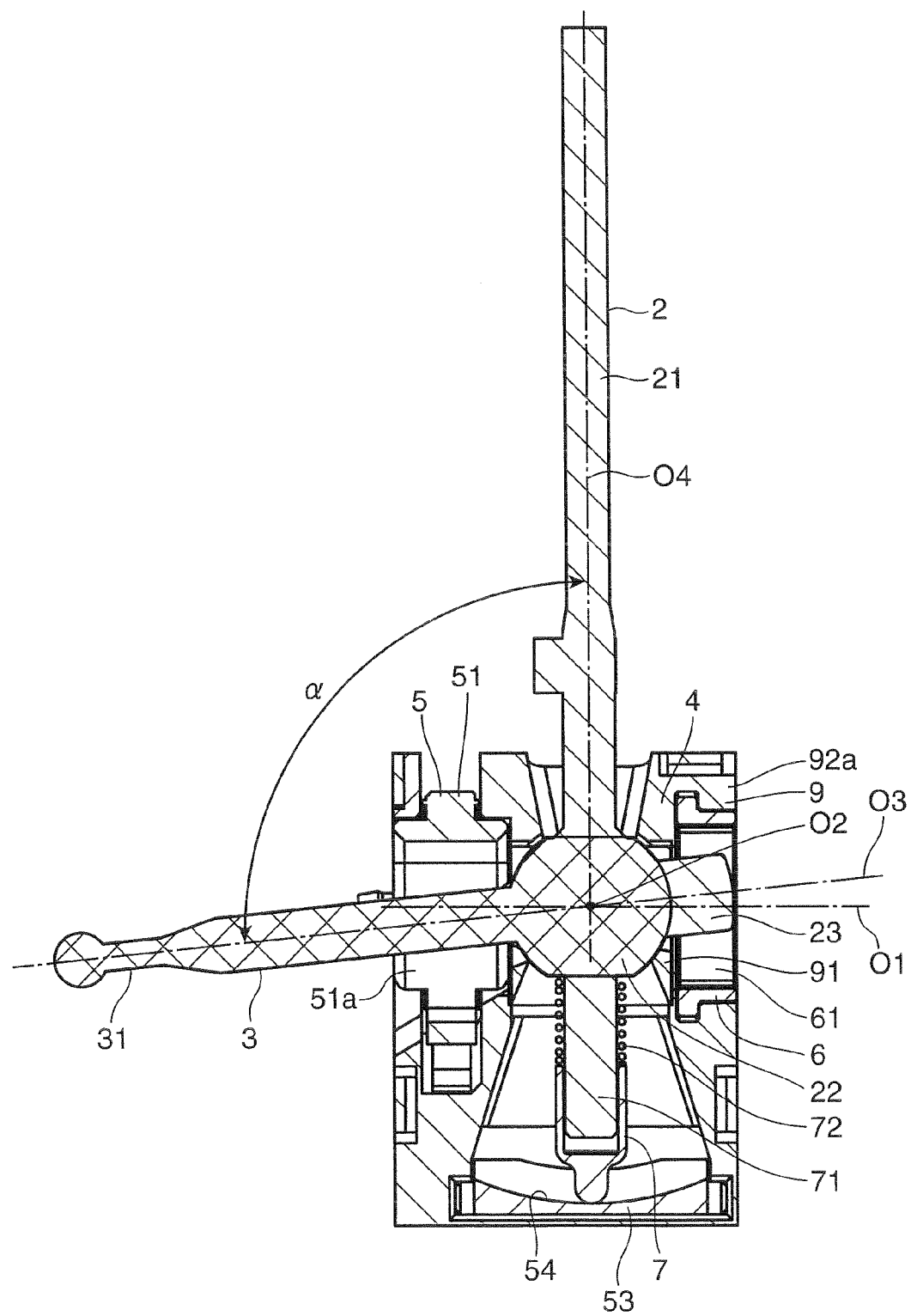
FIG. 4 is a sectional view taken along the line IV-IV in FIG. 2.
Figure 5:
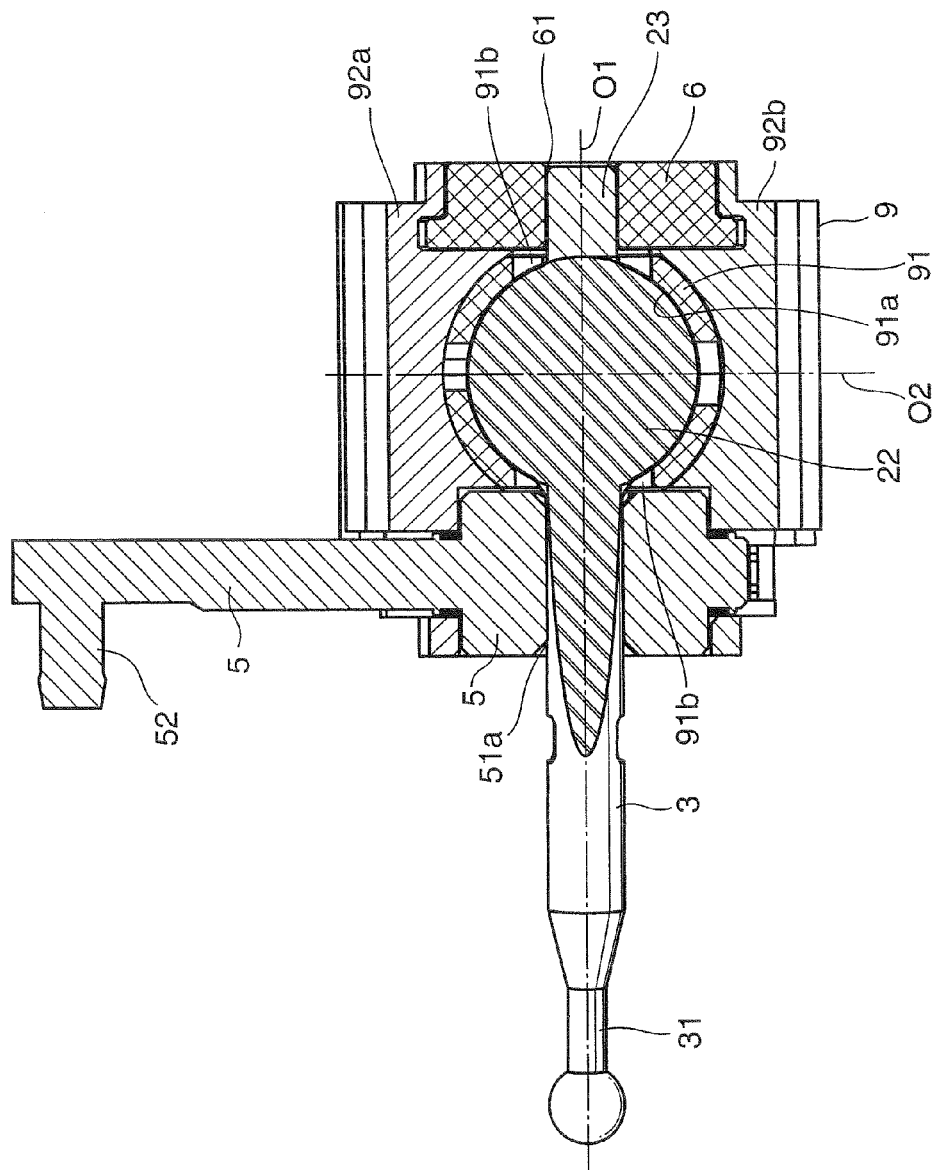
FIG. 5 is a sectional view taken along the line V-V in FIG. 2.

FIG. 1 is an exploded perspective view showing a shifter for a vehicle transmission, according to one embodiment of the present invention. FIG. 2 is a left side view of the shifter, and FIG. 3 is a top plan view of the shifter. FIG. 4 is a sectional view taken along the line IV-IV in FIG. 2, and FIG. 5 is a sectional view taken along the line V-V in FIG. 2.

The shifter according to this embodiment comprises a holder section 4, a shift lever 2 held by the holder section 4, a follower shaft 3 coupled to the shift lever 2, and a connection member 5 which is connectable to a vehicle transmission. The follower shaft 3 is coupled to the shift lever 2, and thereby interlocked with the shift lever 2.

The shift lever 2 has a lever body 21, a spherical portion 22 provided on the lever body 21, and a support shaft 71 provided to protrude downwardly from the spherical portion 22. The spherical portion 22 is provided on a base end, i.e., lower end, of the lever body 21. The lever body 21 is comprised of a round bar-like member having a circular shape in section. The lever body 21 has a distal end (upper end) formed to allow a grip member (not shown) to be attached thereonto. This grip member is configured to be gripped by a hand of a driver when the driver manually moves the shift lever 2.

The follower shaft 3 is comprised of a long round bar-like member having a circular shape in section and approximately the same diameter as that of the lever body 21. The follower shaft 3 has a base end (right end in FIG. 1) fixed to the spherical portion 22. In this embodiment, the follower shaft 3 and the spherical portion 22 are integrally formed in a single piece. Alternatively, the follower shaft 3 and the spherical portion 22 may be prepared as separate components, and then fixed together by welding or other suitable joining means.

The follower shaft 3 is coupled to the spherical portion 22 to protrude from the spherical portion 22 leftwardly (in one lateral direction), in such a manner that an angle α between an axis O3 of the follower shaft 3 and an axis O4 of the lever body 21 is set at a given value close to 90 degrees (e.g., about 95 degrees). In a state after the shift lever 2 is held by the holder section 4, as shown in FIG. 4, when the shifter is viewed in a frontward direction from therebehind, the angle α between the axis O3 of the follower shaft 3 and the axis O4 of the lever body 21 is set at the above given value α. Further, as shown in FIG. 2, when the shifter is viewed in a lateral direction from a left side thereof, an angle between the axis O3 of the follower shaft 3 and the axis O4 of the lever body 21 in a vertical plane along a longitudinal direction is set at zero. That is, the axis O3 of the follower shaft 3 lies in a plane including the axis O4 of the lever body 21.

The holder section 4 comprises a holder body 9 and a cam member 6. The holder body 9 includes a spherical-portion receiving member 91 which holds the spherical portion 22, a housing (92a, 92b) which holds the receiving member 91, and a detent member 53 mounted to the housing (92a, 92b).

The spherical-portion receiving member 91 has a fitting portion 91a. This fitting portion 91a is formed with a plurality of openings 91b each communicating an outside and an internal space thereof.

The fitting portion 91a is formed to have an inner peripheral surface conforming to an outer shape of the spherical portion 22 of the shift lever 2. The spherical portion 22 is rotatably fitted into the fitting portion 91a. Thus, the spherical portion 22 is rotatable in the longitudinal direction about a first rotation axis O1 extending along the lateral direction. Further, the spherical portion 22 is rotatable in the lateral direction about a second rotation axis O2 extending along the longitudinal direction perpendicular to the first rotation axis O1. The first rotation axis O1 is perpendicular to the axis O4 of the lever body 21.

When the spherical portion 22 is rotated about the first rotation axis O1, the distal end of the lever body 21 is moved in the longitudinal direction (X-Y direction). Further, when the spherical portion 22 is rotated about the second rotation axis O2, the distal end of the lever body 21 is moved in the lateral direction (Z-W direction).

The openings 91b are formed in right and left wall portions, front and rear wall portions and upper and lower wall portions of the spherical-portion receiving member 91, respectively. The spherical portion 22 can be fitted into and detached from the fitting portion 91a through the upper opening 91b.

When the spherical portion 22 is fittingly inserted into the fitting portion 91a, the lever body 21 is arranged to protrude upwardly from the fitting portion 91a through the upper opening 91b, and the follower shaft 3 is arranged to protrude leftwardly from the fitting portion 91a through the left opening 91b. Further, in this state, an after-mentioned support shaft 71 is arranged to protrude downwardly from the fitting portion 91a through the lower opening 91b, and an after-mentioned protrusion 23 is arranged to protrude rightwardly from the fitting portion 91a through the right opening 91b.

The housing comprises a front sub-housing 92a, and a rear sub-housing 92b disposed on a rear side of the front sub-housing 92a. The front and rear sub-housings 92a, 92b are formed in generally longitudinally symmetrical shapes, and adapted to be connectable to each other. The front sub-housing 92a and the rear sub-housing 91b are butted against each other while allowing the spherical-portion receiving member 91 to be received in an internal space defined therebetween, so that the spherical-portion receiving member 91 is fixedly held by the housing, i.e., the assembled sub-housings 92a, 92b.

The front sub-housing 92a and the rear sub-housing 92b are fixed together while holding the spherical-portion receiving member 91. The shift lever 2 supported by the spherical-portion receiving member 91, and the follower shaft 3 coupled to the shift lever 2, are swingably held by the housing (92a, 92b) through the spherical-portion receiving member 91.

The detent member 53 serves as a means to position the shift lever 2 while creating a click feeling. The detent member 53 is comprised of a flat-shaped plate, and disposed in a bottom of the housing (92a, 92b) while being clamped between the front sub-housing 92a and the rear sub-housing 92b, so that the detent member 53 is fixedly held by the housing (92a, 92b).

The detent member 53 is formed separately from the front and rear sub-housings 92a, 92b, and assembled to the housing (92a, 92b). Thus, the detent member 53 for a manual transmission (manual-transmission detent member 53) and an after-mentioned detent member 530 for an automatic transmission (automatic-transmission detent member 530) can be selectively mounted to the housing (92a, 92b).

The detent member 53 is formed to have an upper surface formed as a slide surface 54 for allowing a slider 7 connected to the shift lever 2 to be slidingly moved therealong. This slider 7 is held by the support shaft 71 movably in an axial direction of the support shaft 71. The support shaft 71 is formed to extend downwardly from a lower end of the spherical portion 22 of the shift lever 2. The slider 7 is adapted to be moved in a direction toward the slide surface 54 and in a direction away from the slide surface 54, and biased in the direction toward the slide surface 54 (downwardly) by a coil spring 72 serving as a bias member fixed on the support shaft 71.

That is, in conjunction with a movement of the shift lever 2, the slider 7 is moved in such a manner that a distal end (lower end) thereof is slidingly moved along the slide surface 54 under a biasing force of the coil spring 72.

In this embodiment, the slide surface 54 is formed to be curvedly concave-shaped and a concaved downwardly in a central region. The slide surface 54 is provided with a plurality of concave portions each capable of receiving therein the slider 7. Each of the concave portions allows the shift lever 2 to be positioned while creating a click feeling, as will be described in detail later.

The cam member 6 will be more specifically described below. The cam member 6 is designed to restrict the shift lever 2 from being rotated about the axis O4 of the lever body 21 so as to allow the shift lever 2 to be swingingly moved only in the longitudinal and lateral directions about the spherical portion 22. The cam member 6 is comprised of a disk-shaped member disposed in concentric relation to the first rotation axis O1.

The cam member 6 is formed with a slot-shaped protrusion fitting hole 61. The protrusion fitting hole 61 has a size allowing a protrusion 23 of the shift lever 2 to be inserted thereinto. The protrusion 23 of the shift lever 2 is provided to protrude from the spherical portion 22 rightwardly (in the other lateral direction), and formed in a quadrangular prism shape. The protrusion 23 is formed to be movable inside the protrusion fitting hole 61 and along a lengthwise direction of the protrusion fitting hole 61.

The cam member 6 is mounted to a right end (one of opposed lateral ends) of the housing (92a, 92b) in such a manner as to allow the protrusion 23 to be rotated about the first rotation axis O1 while being fittingly inserted into the protrusion fitting hole 61, as shown in FIG 4. That is, the cam member 6 is mounted to the housing (92a, 92b) rotatably about an axis thereof extending in the lateral direction.

The connection member 5 will be more specifically described below. The connection member 5 is designed to operate a vehicle transmission through a shift cable (not shown) connected to the transmission. The connection member 5 has a rear end (one end) formed as a disk-shaped attaching portion 51, and a front end (the other end) formed as a shift-cable connection portion 52 adapted to be connected to the shift cable. The attaching portion 51 is mounted to the housing (92a, 92b) in concentric relation to the first rotation axis O1.

The attaching portion 51 has a shaft insertion hole 51a formed in a region including an axis thereof. The shaft insertion hole 51a is formed to allow the follower shaft 3 to penetrate therethrough. Specifically, the shaft insertion hole 51a has a width dimension approximately equal to an outer diameter of the follower shaft 3, and a length dimension allowing the follower shaft 3 to be moved thereinside and along a lengthwise direction thereof The attaching portion 51 is sandwiched between respective left ends of the front housing 92a and the rear housing 92b (which form the other end of the housing) rotatably about the first rotation axis O1, while allowing the follower shaft 3 to penetrate through the shaft insertion hole 51a, as shown in FIG. 4. In this manner, the connection member 5 is held by the housing (92a, 92b).

A process of assembling the above shifter as a manual transmission shifter, and a process of assembling the above shifter as an automatic transmission shifter, will be described below.

Figure 6:
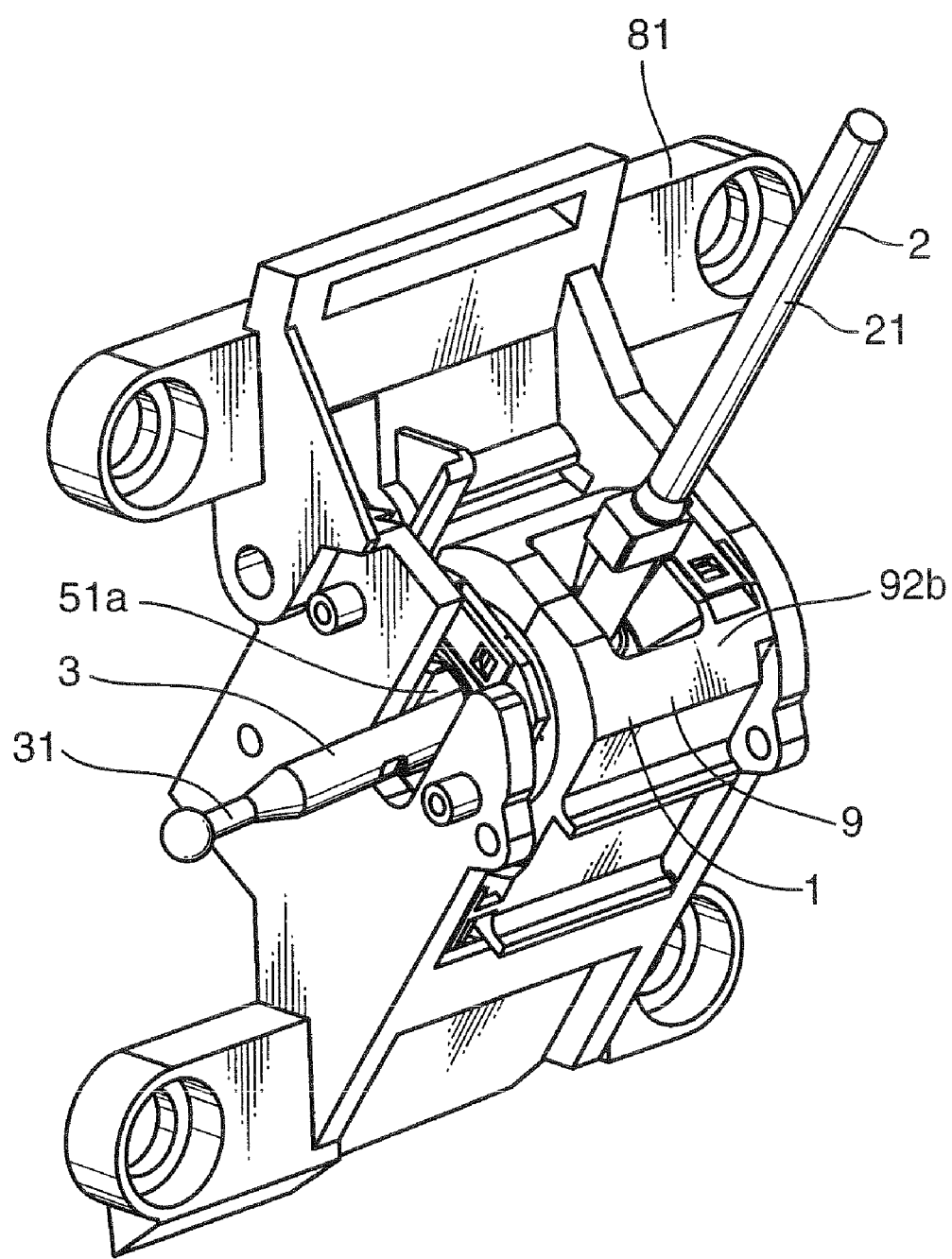
FIG. 6 is a perspective view showing the shifter in a state after being fixed to a manual-transmission base member.

For example, as shown in FIG. 6, in one case where the above shifter 1 is used for a manual transmission, a base member 81 for a manual transmission (manual-transmission base member 81) is used. The manual-transmission base member 81 is adapted to support the holder section 4, and mounted to a vehicle body by a bolt. The holder section 4 of the shifter 1 is fixed to the vehicle body through the manual-transmission base member 81.

A shift cable (not shown) is connected to the shift-cable connection portion 52 of the shift-cable connection member 5 (see FIGS. 1 to 3), and a selection cable (not shown) is connected to a selection-cable connection portion 31 (illustrated in FIGS. 1 to 3) of the follower shaft 3.

Figure 7A:
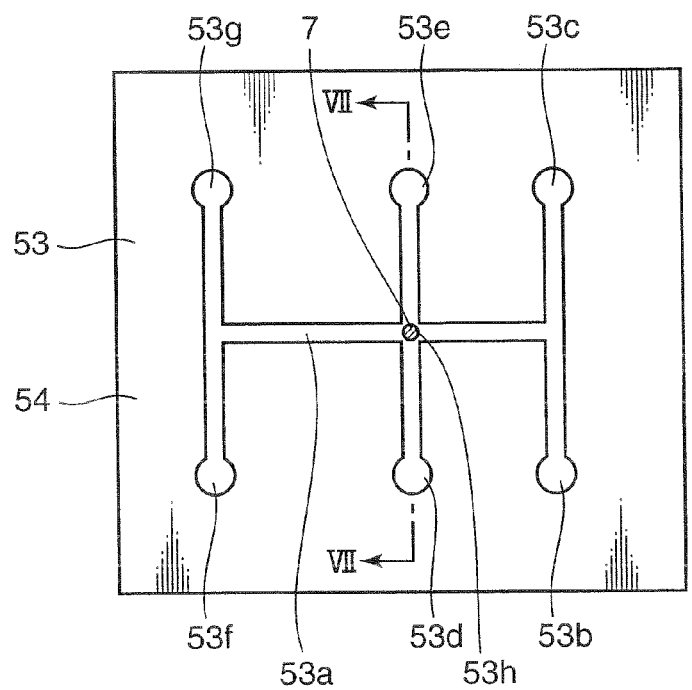
FIG. 7A is an explanatory top plan view showing a manual-transmission detent mechanism.
Figure 7B:
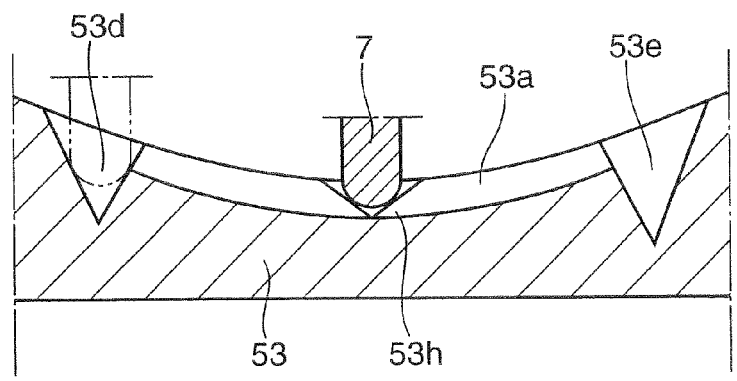
FIG. 7B is a sectional view taken along the line VII-VII in FIG. 7A.

In case where the above shifter 1 is assembled as a manual transmission shifter, the manual-transmission detent member 53 is formed, for example, as shown in FIGS. 7A and 7B. This detent member 53 has a slide surface 54 formed to have a six concave portions 53b to 53g, and a slide groove 53a with a depth less than that of each of the concave portions 53b to 53g. The slide groove 53a consists of three grooves each extending in the longitudinal direction and one groove extending in the lateral direction. The concave portions 53b to 53g are arranged at respective ones of opposite ends of the three longitudinally-extending grooves.

Each of the concave portions 53b to 53g is arranged at a different position where the slider is located when the shift lever 2 is manually set in a respective one of six shift positions corresponding to 1st speed to 5th speed gear positions and a reverse (R) gear position of the manual transmission. Specifically, the concave portion 53b, the concave portion 53c, the concave portion 53d, the concave portion 53e, the concave portion 53f and the concave portion 53g are arranged at a 1st speed-corresponding position (i.e., a position corresponding to the first-speed gear position), a 2nd speed-corresponding position (i.e., a position corresponding to the second-speed gear position), a 3rd speed-corresponding position (i.e., a position corresponding to the third-speed gear position), a 4th speed-corresponding position (i.e., a position corresponding to the fourth-speed gear position), a 5th speed-corresponding position (i.e., a position corresponding to the fifth-speed gear position), and an R-corresponding position (i.e., a position corresponding to the R gear position). Each of the concave portions 53b to 53g is formed to allow the slider 7 to be fittingly received therein. The slide groove 53a is communicated with each of the concave portions 53b to 53g so as to guide the slider 7 to each of the concave portions 53b to 53g.

Further, as shown in FIG. 7A, a central portion of an intermediate one of the three longitudinally-extending grooves of the slide groove 53a is used as a neutral-corresponding position 53h, i.e., a shift position corresponding to a neutral gear position of the manual transmission. When the slider 7 is moved to the neutral-corresponding position 53h, the lever body 21 of the shift lever 2 is positioned to stand upright, as shown in FIG. 4. Specifically, in this state, the lever body 21 of the shift lever 2 is positioned to have almost no inclination in the lateral direction of the housing (92a, 92b), and the axis O4 of the lever body 21 becomes perpendicular to the first rotation axis O1. Further, the axis O3 of the follower shaft 3 extends downwardly at a given angle (in this embodiment, about 5 degrees) with respect to the first rotation axis O1.

Then, when the distal end of the lever body 21 is manually pushed frontwardly (in the X direction in FIGS. 2 and 3) from the above position, each of the lever body 21 and the follower shaft 3 is swingingly moved about the first rotation axis O1. During this movement, the selection-cable connection portion 31 formed in a distal end of the follower shaft 3 is moved rearwardly (in the X direction in FIG. 2), because the axis O3 of the follower shaft 3 is inclined at the given angle relative to the first rotation axis O1.

During a course where the follower shaft 3 is swingingly moved in such a manner that the distal end thereof is moved rearwardly, the follower shaft 3 presses an inner wall surface of the attaching portion 51 of the shift-cable connection member 5 defining the shaft insertion hole 51*a*. Thus, the attaching portion 51 is rotated in a counterclockwise direction (in the X direction) in FIG. 2, and the shift-cable connection portion 52 connected with the shift cable is swingingly moved in the same direction. Thus, the shift cable is operated. In the above manner, both the selection cable and the shift cable can be operated. The inclination angle of the follower shaft 3 may be set at an appropriate value which allows a swing movement thereof and a rotation of the attaching portion 51 to be caused by a manual operation of the shift lever 2 in the longitudinal direction.

Then, when the lever body 21 is further tilted frontwardly to allow the slider 7 to be fitted into the concave portion 53*d* at the 3rd speed-corresponding position, the lever body 21 can be positioned while creating a click feeling, to maintain the 3rd speed gear position of the manual transmission.

When the lever body 21 is manually tilted rearwardly (in the Y direction in FIGS. 2 and 3), the distal end of the follower shaft 3 is swingingly moved frontwardly. Along with this movement, the shift-cable connection member 5 is swingably moved in a clockwise direction in FIG. 2 to allow the shift-cable connection portion 52 to be moved upwardly. In this manner, both the selection cable and the shift cable can be operated. Further, when the slider 7 is fitted into the concave portion 53*e* at the 4th speed-corresponding position, the lever body 21 can be positioned in this state while creating a click feeling. In this state, the manual transmission is maintained in the 4th speed gear position.

When the lever body 21 is manually pushed leftwardly (in the Z direction in FIG. 3) from a state when the slider 7 is located at the neutral-corresponding position 53*h*, the axis O3 of the follower shaft 3 is further inclined downwardly relative to the first rotation axis O1 as shown in FIG. 8A. As also shown in FIG. 8A, the slide surface 54 of the detent member 53 is formed and arranged such that the neutral-corresponding position 53*h* is located at a lowermost position. Thus, if a driver releases his/her hand from the lever body 21 after being tilted leftwardly, the slider 7 will be automatically returned to the neutral-corresponding position 53*h* by a biasing force, for example, of the coil spring 72.

Then, when the lever body 21 after being tilted leftwardly is manually pushed frontwardly, the follower shaft 3 is swingably moved about the first rotation axis O1 to allow the distal end of the follower shaft 3 to be moved rearwardly. Along with this movement, the attaching member 51 is rotated in the counterclockwise direction in FIG. 2, and the shift-cable connection member 5 is swingingly moved in the same direction. In this manner, both the selection cable and the shift cable can be operated.

Then, when the slider 7 is fitted into the concave portion 53*b* at the 1st speed-corresponding position illustrated in FIG. 7A, the lever body 21 can be positioned while creating a click feeling, to maintain the 1st speed gear position of the manual transmission.

Differently, when the lever body 21 is manually pulled rearwardly from the position illustrated in FIG. 8A, the slider 7 will be fitted into the concave portion 53*c* at the 2nd speed-corresponding position, so that the lever body 21 can be positioned to maintain the 2nd speed gear position of the manual transmission.

When the lever body 21 is manually pushed rightwardly (in the W direction in FIG. 3) from the state when the slider 7 is located at the neutral-corresponding position 53*h*, the axis O3 of the follower shaft 3 is inclined on an opposite side of the aforementioned position with respect to the first rotation axis O1, as shown in FIG. 8B. That is, the follower shaft 3 is inclined such that the distal end of the follower shaft 3 is located above the first rotation axis O1.

Then, when the lever body 21 at this position is manually moved rearwardly or frontwardly, the slider 7 will be fitted into the concave portion 53*f* at the 5th speed-corresponding position or the concave portion 53*g* at the R-corresponding position, so that the lever body 21 can be positioned while creating a click feeling, to maintain the 5th speed gear position or the R gear position of the manual transmission.

The following description will be made about another case where the above shifter is used as an automatic transmission shifter.

Figure 9:
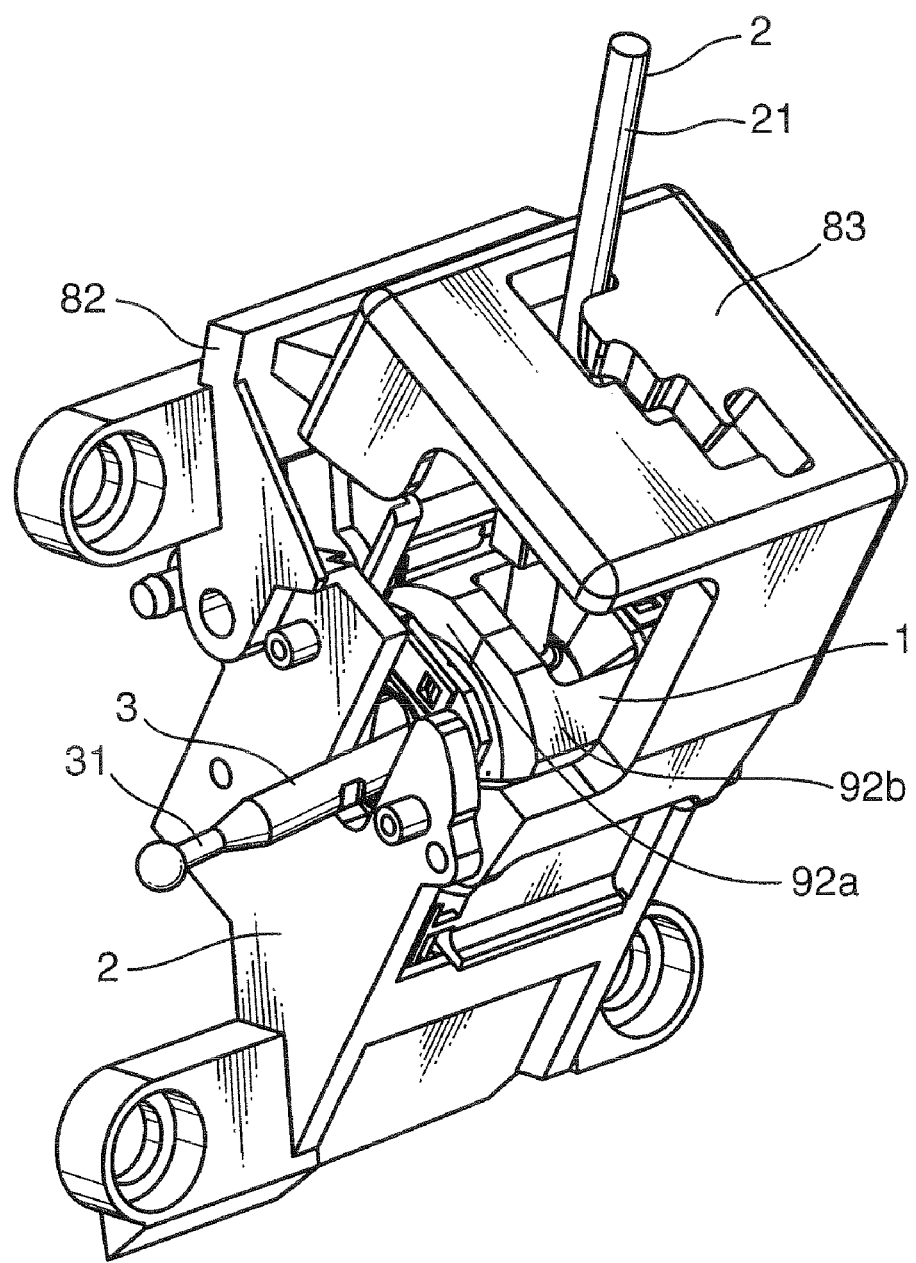
FIG. 9 is a perspective view showing the shifter in a state after being fixed to an automatic-transmission base member.

In this case, for example, a base member 82 for an automatic transmission (automatic-transmission base member 82) as shown in FIG. 9 is used. The automatic-transmission base member 82 is adapted to support the holder section 4, and mounted to a vehicle body by a bolt. The holder section 4 of the shifter 1 is fixed to the vehicle body through the automatic-transmission base member 82.

Figure 10:
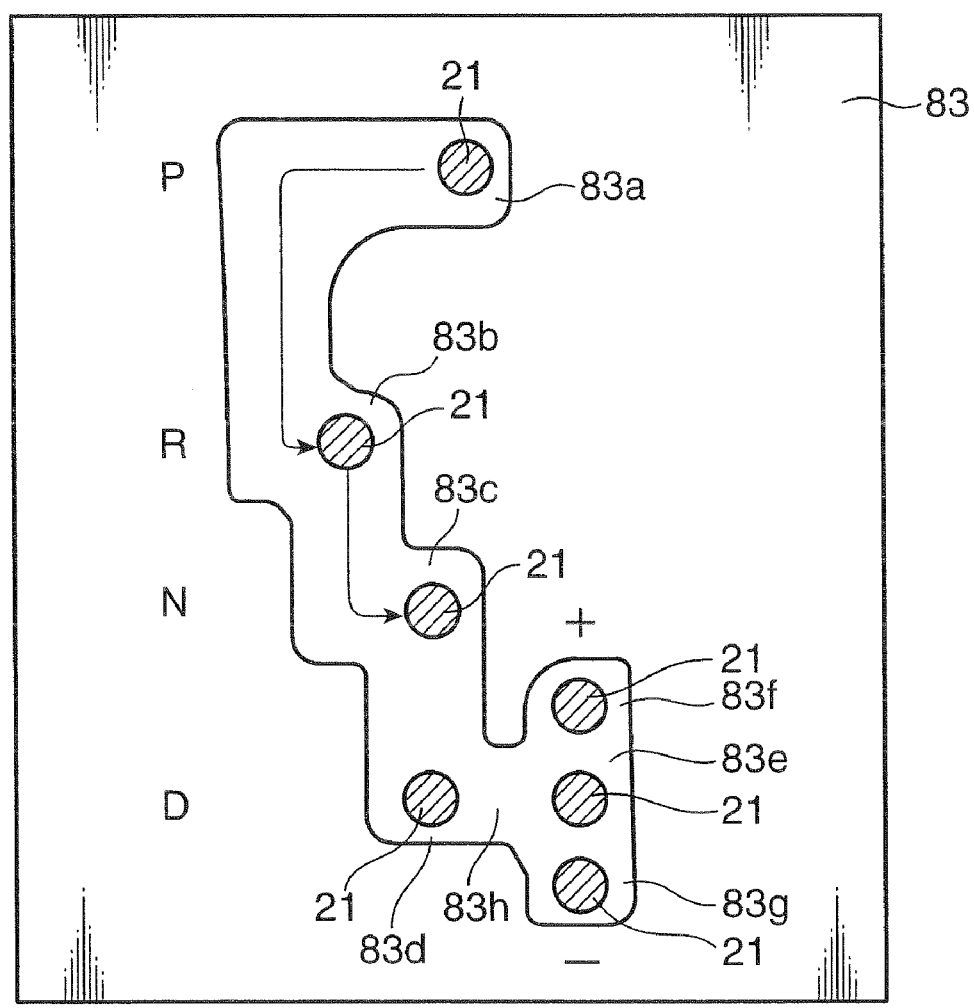
FIG. 10 is a top plan view showing a gate plate provided in the automatic transmission base member.

The automatic-transmission base member 82 is provided with a gate plate 83. The gate plate 83 has a gate slot formed to allow the lever body 21 of the shift lever 2 to penetrate therethrough. As shown in FIG. 10, the gate slot includes a park (P) gate 83*a*, a reverse (R) gate 83*b*, a neutral (N) gate 83*c* and a drive (D) gate 83*d*. The P gate 83*a*, the R gate 83*b*, the N gate 83*c* and the D gate 83*d* correspond to respective shift positions for a park (P) range, a reverse (R) range, a neutral (N) range and a drive (D) range. The P gate 83*a*, the N gate 83*c* and the D gate 83*d* are linearly arranged in a rearward direction in this order.

An automatic-transmission detent member 530 has the same outer shape as that of the manual-transmission detent member 53. Thus, the automatic-transmission detent member 530 can be clamped between the front sub-housing 92*a* and the rear sub-housing 92*b* so as to replace the manual-transmission detent member 53 with the automatic-transmission detent member 530.

Figure 12A:
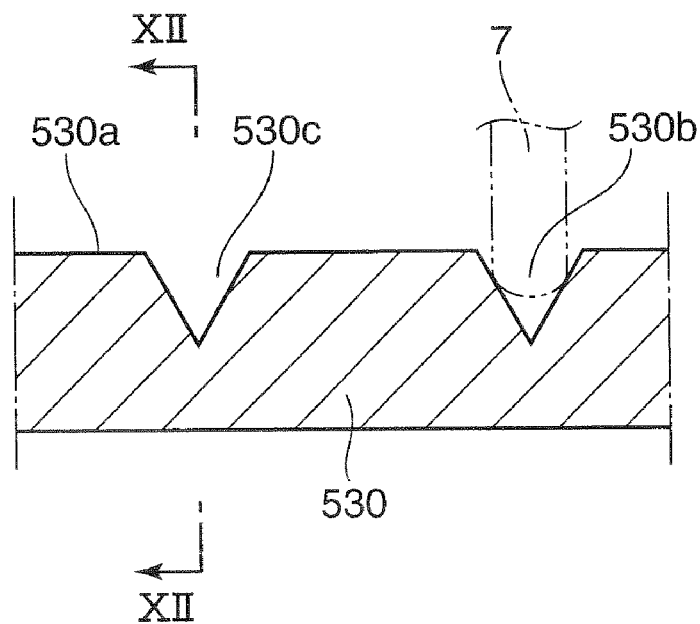
FIG. 12A is an enlarged sectional view showing a detent member of the shifter in the case where the shifter is assembled as an automatic transmission shifter, wherein only two concave portions corresponding to a drive (D) gate and the manual-mode (M) gate are shown.

As shown in FIG. 12A, the detent member 530 has a slide surface 530*a* formed to have a plurality of concave portions including an after-mentioned D gate-corresponding concave portion 530*b* and a manual mode (M) gate-corresponding concave portion 530*c*. Each of the concave portions has a shape conforming to that of a respective one of the gates of the gate plate 83. For example, each of the concave portions is formed in a different position into which the slider 7 of the shift lever 21 is slidingly moved when the lever body 21 of the shift lever 2 is set in a respective one of the gates 83*a* to 83*d*, as will be described in detail later.

An automatic transmission is not provided with a cable corresponding to the selection cable in the manual transmission. Thus, in the case where the shifter 1 is used as an automatic transmission shifter, a shift cable connected to an automatic transmission is connected to the shift-cable connection portion 52 of the shift-cable connection member 5, and no cable is connected to the select-cable connection portion 31 of the follower shaft 3. That is, the follower shaft 3 serves as a swingable connection member for operatively moving the shift-cable connection member 5.

The automatic transmission for use in this embodiment is adapted to be selectively changed over between an automatic mode and a manual mode. More specifically, as shown in FIG. 10, the gate plate 83 of the base member 82 is formed with a manual mode (M) gate 83*e* disposed on a right side of the D gate 83d to extend in the longitudinal direction, and a communication passage 83h communicating between the M gate 83e and the D gate 83d.

The communication passage 83h is provided with a changeover detection sensor (not shown). The changeover detection sensor is operable to detect a fact that the lever body 21 is moved into the communication passage 83h. Based on this detection, it is determined that the automatic mode is changed to the manual mode.

The M gate 83e includes a plus gate 83f and a minus gate 83g. The plus gate 83f is provided with a plus detection sensor (not shown). The plus gate 83f and the minus gate 83g are arranged in a line in the longitudinal direction.

As shown in FIG. 12A, the slide surface 530a of the automatic-transmission detent member 530 is formed with a D gate-corresponding concave portion 503b at a position where the slider 7 is located when the lever body 21 is set in the D gate 83a. Further, the slide surface 530a is formed with an M gate-corresponding concave portion 530c on a left side of the D gate-corresponding concave portion 530b and at a position where the slider 7 is located when the lever body 21 is set in the M gate 83e.

Each of the D gate-corresponding concave portion 530b and the M gate-corresponding concave portion 530c is formed in such a manner as to be depressed relative to the slide surface 530a.

Figure 12B:
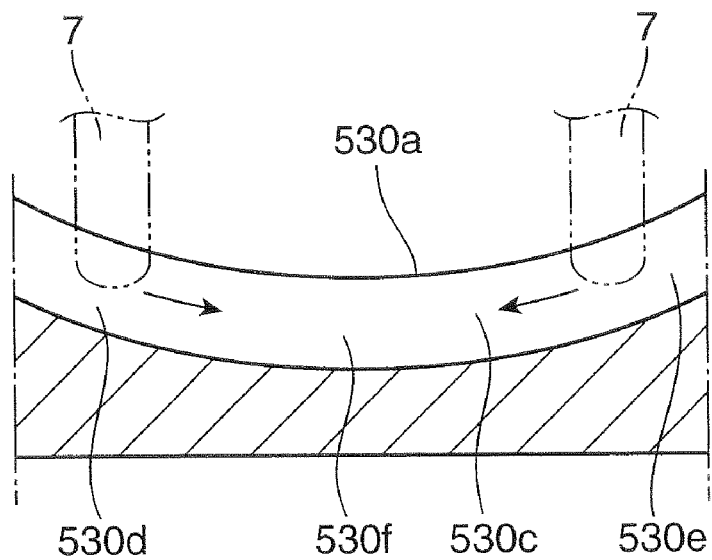
FIG. 12B is a sectional view taken along the line XII-XII in FIG. 12A.

In this embodiment, as shown in FIG. 12B, the M gate-corresponding concave portion 530c is formed to be gradually lowered in a direction from each of a plus gate-corresponding position 530d which is a position where the slider 7 is located when the lever body 21 is set in the plus gate 83f, and a minus gate-corresponding position 530e which is a position where the slider 7 is located when the lever body 21 is set in the minus-gate position 83g, toward a central region 530c of the M gate-corresponding concave portion 530c. The central region 530c of the M gate-corresponding concave portion 530c is formed to be located away from the slider 7, as compared with the plus gate-corresponding position 530d and the minus gat-corresponding position 530e.

Thus, the slider 7 which is moved toward the plus gate-corresponding position 530d or the minus gat-corresponding position 530e of the M gate-corresponding concave portion 530c along with a movement of the lever body 21 toward the plus gate 83f or the minus gate 83g, can be automatically returned to the central region 530f of the M gate-corresponding concave portion 530c by the biasing force of the coil spring 72.

Means for automatically returning the lever body 21 is not limited to the above mechanism. For example, in place of or in addition to the above mechanism, an additional bias member (not shown) for returning the lever body 21 to the central region of the M gate 83e may be provided.

Although not illustrated, the slide surface 530a is further formed with a P gate-corresponding concave portion at a position where the slider 7 is located when the lever body 21 is set in the P gate, an R gate-corresponding concave portion at a position where the slider 7 is located when the lever body 21 is set in the R gate, and an N gate-corresponding concave portion at a position where the slider 7 is located when the lever body 21 is set in the N gate.

Figure 11A:
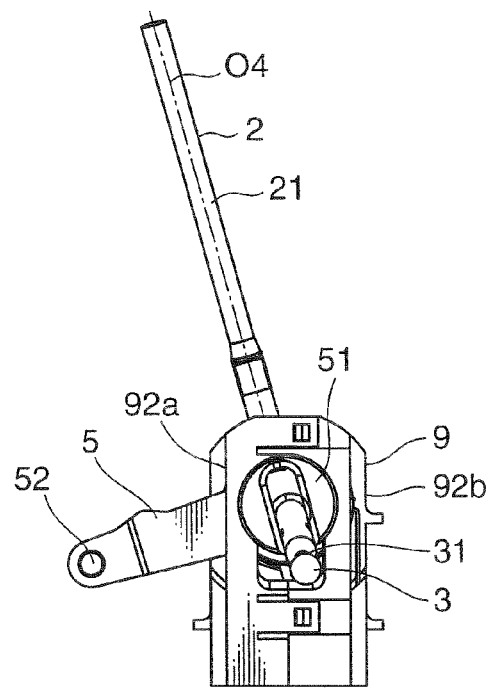
FIG. 11A is an explanatory side view showing respective movements of the shift lever and the follower shaft of the shifter in case where the shifter is assembled as an automatic transmission shifter, wherein the shift lever is moved into a park (P) gate.

In the case where the shifter is used as an automatic transmission shifter, when the lever body 21 is set in the P gate 83a illustrated in FIG. 10, the shifter is positioned as shown in FIG. 11A. In this state, the axis O4 of the lever body 21 of the shift lever 2 is inclined frontwardly relative to the housing (92a, 92b). As to the lateral direction, the lever body 21 is positioned in the same state as that in FIG. 4 without any inclination. Further, the axis O4 and the first rotation axis O1 are perpendicular to each other, and the axis O3 of the follower shaft 3 extends at a given angle with respect to the first rotation angle O1.

For example, when the lever body 21 is moved manually inclined leftwardly from the P gate 83a ("P" shift position) illustrated in FIG. 10, and then moved to the R gate 83b ("R" shift position) while being manually pulled rearwardly, the follower shaft 3 is swingably moved about the first rotation axis O1 along with the rearward movement of the lever body 21. During this movement, the distal end of the follower shaft 3 is swingably moved frontwardly, because the axis O3 of the follower shaft 3 is inclined at the given angle other than 90 degrees relative to the first rotation axis O1, to press the inner wall surface of the attaching portion 51 of the connection member 5 defining the shaft insertion hole 51a along with the swing movement. According to the pressing, the attaching portion 51 of the connection member 5 is rotated in the clockwise direction in FIG. 11A. Thus, the shift-cable connection portion 52 connected with the shift cable is swingably moved in the same direction. In this manner, the shift cable can be operated.

Figure 11B:
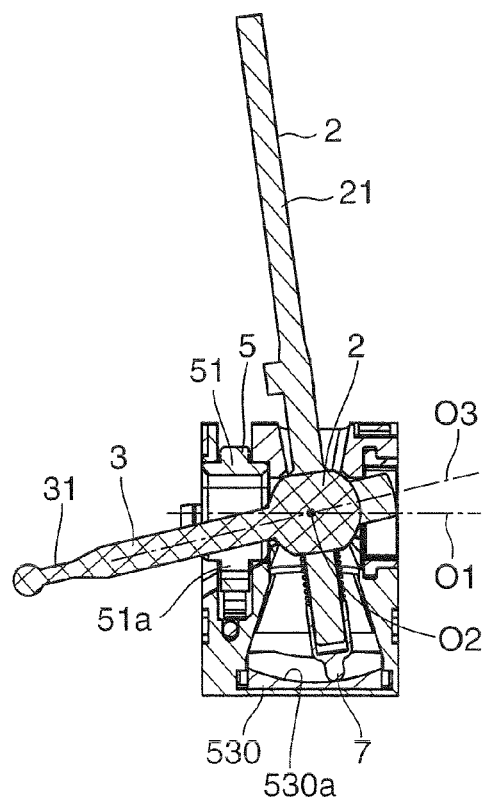
FIG. 11B is an explanatory side view showing respective movements of the shift lever and the follower shaft of the shifter in the case where the shifter is assembled as an automatic transmission shifter, wherein the shift lever is moved into a reverse (R) gate.

When a driver releases his/her hand from the lever body 21 after being inclined leftwardly from the P gate 83a as shown in FIG. 11B, the lever body 21 will be automatically returned rightwardly. Specifically, a position of the slide surface 54 of the detent member 530 becomes gradually higher toward a lateral edge of the slide surface 54, so that, when the slider 7 is moved along the concave portion toward the lateral edge of the slide surface 54, the biasing force of the coil spring 72 will be gradually increased. Thus, when a driver releases his/her hand from the lever body 21 after being inclined leftwardly, the lever body 21 will be automatically returned to its original upstanding position.

When the lever body 21 reaches the R gate 83b, it is slightly inclined leftwardly, as shown in FIG. 11B.

Then, when the lever body 21 is further pulled rearwardly from the R gate 83b (R shift position) and moved to the N gate 83c ("N" shift position), the distal end of the follower shaft 3 is further swingably moved frontwardly. Along with this swing movement, the attaching portion 51 of the connection member 5 is rotated in the clockwise direction in FIG. 11A. Thus, the shift-cable connection portion 52 is swingably moved in the same direction, so that the shift cable can be operated.

As to the position of the lever body 21 relative to the housing (92a, 92b) in the lateral direction, the state when the lever body 21 reaches the N gate 83c is the same as that when it is set in the P gate 83a. In this state, the lever body 21 is at the same position as that in FIG. 4

Then, when the lever body 83c is further pulled rearwardly from the N gate 83c ("N" shift position) and moved to the D gate 83d ("D" shift position), the distal end of the follower shaft 3 is further swingably moved frontwardly. Along with this swing movement, the attaching portion 51 of the connection member 5 is rotated in the clockwise direction in FIG. 11A, and the shift-cable connection portion 52 is swingably moved in the same direction. In this manner, the shift cable can be operated.

As to the position of the lever body 21 relative to the housing (92a, 92b) in the lateral direction, the state when the lever body 21 reaches the D gate 83d is also the same as that when it is set in the P gate 83a, i.e., the lever body 21 is at the same position as that in FIG. 4

Then, when the lever body 21 is moved from the D gate 83d into the M gate 83e through the communication passage 83h while being inclined rightwardly, the detection sensor detects the movement. The detection sensor sends an electric signal indicative of the changeover from the automatic mode to the manual mode, to a control unit (not shown) provided in the vehicle.

Figure 11C:
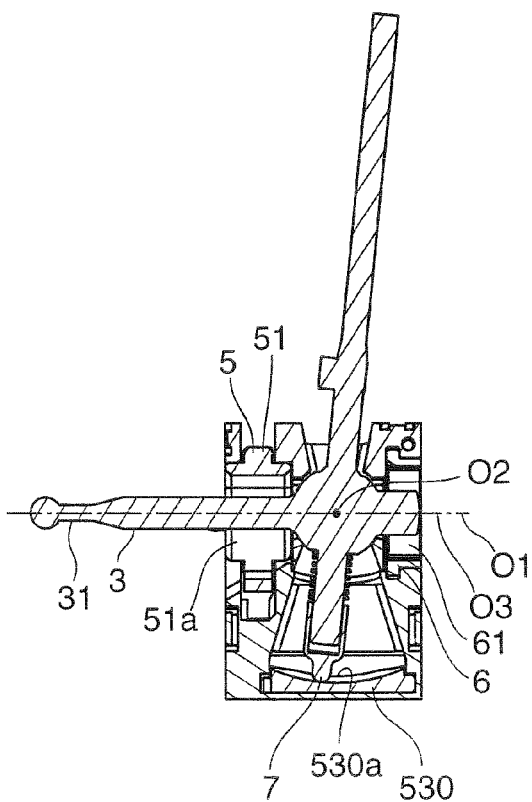
FIG. 11C is an explanatory side view showing respective movements of the shift lever and the follower shaft of the shifter in the case where the shifter is assembled as an automatic transmission shifter, wherein the shift lever is moved into a manual-mode (M) gate.

As shown in FIG. 11C, in the lever body 21 set in the M gate 83e, the axis O3 of the follower shaft 3 is aligned with the first rotation axis O1. Further, when the lever body 21 is set in the M gate 83e, the slider 7 is fitted into the M gate-corresponding concave portion 530c of the detent member 530, so that the lever body 21 is held in the M gate 83e. Thus, the M gate-corresponding concave portion 530c also serves as a means to allow the lever body to be held in a position of the manual mode ("M" shift position).

Then, in this state, the lever body 21 is pushed frontwardly while being swingingly moved about the first rotation axis O1, and set in the plus gate 83f. Although the follower shaft 3 is rotated about the axis O3 during this movement, it is kept from pressing the inner wall surface of the attaching portion 51 defining the shaft insertion hole 51a, because the axis O3 of the follower shaft 3 and the first rotation axis O1 are aligned with each other, and thereby the follower shaft 3 has no swing movement in the longitudinal direction in the shaft insertion hole 51a of the attaching portion 51. Thus, the connection member 5 is not swingably moved. Consequently, the shift-cable connection portion 52 is maintained in one position to allow the drive (D) gear position to be maintained.

Then, when the lever body 21 is set in the plus gate 83f, the detection sensor detects this action and sends an electric signal to the control unit. In response to receiving the electric signal, the control unit operates to shift up the automatic transmission by one speed stage.

Then, the slider 7 moved to the plus gate-corresponding position 530d in conjunction with setting the lever body 21 in the plus gate 83f is automatically returned to the central region 530f while being slidingly moved along the M gate-corresponding concave portion 530c by the biasing force of the coil spring 72 (see FIG. 1), as shown in FIG. 12B.

When the lever body 21 is manually pulled rearwardly from a longitudinally central region of the M gate 83e, it is set in the minus gate 83g while being swingingly moved about the first rotation axis O1. In this operation, the follower shaft 3 is also kept from pressing and swingingly moving the connection member 5, because the axis O3 of the follower shaft 3 and the first rotation axis O1 are aligned with each other. Thus, the shift-cable connection portion 52 of the connection member 5 is maintained in one position to allow the automatic transmission to be maintained in the drive (D) gear position.

Then, when the lever body 21 is set in the minus gate 83g, the detection sensor detects this action and sends an electric signal to the control unit. In response to receiving the electric signal, the control unit operates to shift down the automatic transmission by one speed stage.

Then, the slider 7 moved to the minus gate-corresponding position 530e in conjunction with setting the lever body 21 in the minus gate 83g is automatically returned to the central region 530f while being slidingly moved along the M gate-corresponding concave portion 530c by the biasing force of the coil spring 72, as shown in FIG. 12B.

Although the above embodiment has been described based on one example where an automatic transmission is adapted to be selectively changed over between an automatic mode and a manual mode, a transmission having only an automatic mode may also be used.

Further, although the shifter according to the above embodiment is designed to form a concave portion in the detent member (53, 530) and allow the slider 7 to be fitted into the concave portion so as to position the shift lever 2 while creating a click feeling, the present invention is not limited to this structure. For example, the shifter may be designed to provide a plate having a concave portion on the side of the shift lever 2, and a spring member interlockable with the shift lever 2, and allow a distal end of the spring member to be appropriately fitted into the concave portion so as to position the shift lever 2 while creating a click feeling.

SUMMARY OF THE EMBODIMENT

The above embodiment is summarized as follows.

(1) In the above embodiment, when the shift lever is swingingly moved in the longitudinal direction (first direction) by a manual operation, the follower shaft presses the inner surface of the attaching portion of the shift-cable connection member defining the shaft insertion hole. According to the pressing, the shift-cable connection member is swingingly moved. Thus, even if the shifter is selectively used with an automatic transmission and a manual transmission, a shift cable connected to each of the two types of transmissions can be adequately operated.

In case where the shifter is used with a manual transmission, it is necessary to operate a selection cable in addition to the shift cable. This selection cable is connected to the distal end of the follower shaft. Then, when shift lever is manually moved in the lateral direction (second direction), the follower shaft is freely moved inside the shaft insertion hole of the shift-cable connection member and along a lengthwise direction of the shaft insertion hole. That is, the follower shaft is moved inside the shaft insertion hole almost without pressing the inner surface of the attaching portion defining the shaft insertion hole, so that the follower shaft can be relatively moved with respect to the shift-cable connection member without causing a swing movement of the shift-cable connection member. Then, the shift lever can be manually moved in the longitudinal direction to operate the selection cable connected to the follower shaft, and the shift cable connected to the shift-cable connection member, in various positions.

As above, the shifter according to the above embodiment is compatible with both an automatic transmission and a manual transmission. Thus, the shifter according to the above embodiment makes it possible to facilitate commonization of components and assembling processes for the automatic and manual transmissions. This makes it possible to achieve reduction in cost of the shifter.

(2) Preferably, the holder section comprises a holder body, and a cam member formed with a slot-shaped protrusion fitting hole and rotatably held by the holder body, and the base end of the shift lever includes a spherical portion having a protrusion which is fittingly inserted into the protrusion fitting hole of the cam member movably in a lengthwise direction of the protrusion fitting hole, in such a manner that the protrusion is moved to press an inner surface of the protrusion fitting hole in conjunction with a rotation of the spherical portion in the longitudinal direction so as to rotate the cam member, and linearly moved inside the protrusion fitting hole in a lengthwise direction of the protrusion fitting hole, in conjunction with a rotation of the spherical portion in the lateral direction.

In this shifter, when the spherical portion is rotated in the lateral direction by manually moving the shift lever in the lateral direction, the protrusion is moved inside the protrusion fitting hole in a lengthwise direction of the protrusion fitting hole. When the spherical portion is rotated in the longitudinal direction by manually moving the shift lever in the longitudinal direction, the cam member is rotated together with the protrusion. This makes it possible to rotate the spherical portion in the lateral direction and the longitudinal direction. The cam member is rotatable only about an axis extending in the lateral direction without rotating in any other direction. Thus, a combination of the protrusion and the cam member can restrict a rotation direction of the spherical portion. That is, the rotation of the spherical portion in other directions can be prohibited by allowing the protrusion and the cam member to be brought into engagement with each other.

As above, this shifter is designed to permit a tilt movement of the shift lever only in the lateral direction and the longitudinal direction. This makes it possible to provide enhanced reliability of the cable operation based on the shift lever.

(3) Preferably, the shifter further comprises a slider which is movable relative to the shift lever in an axial direction of the shift lever, and a bias member biasing the slider, wherein the holder section has a slide surface located in opposed relation to the slider to allow the slider to be slidingly moved therealong, and wherein the slide surface has a plurality of concave portions each depressed relative to the slide surface at a different position where the slider is located when the shift lever is set in a respective one of a plurality of shift positions, in such a manner that the slider is fitted into each of the concave portions under a biasing force of the bias member, when the shift lever is manually moved and set in a corresponding one of the shift positions.

In this shifter, the slider is biased in a direction toward the slide surface. When the shift lever is manually set in each of the shift positions, the slider is fitted into a corresponding one of the concave portions under the biasing force of the bias member. This makes it possible to readily position the shift lever in each of the shift positions while creating a click feeling to allow a driver to recognize meeting with the shift position.

This application is based on Japanese Patent Application Serial No. 2008-47609, filed in Japan Patent Office on Feb. 28, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shifter for use with a vehicle transmission, comprising:
a shift lever having a base end;
a holder section comprising a holder body which holds the base end of the shift lever rotatably in first and second directions perpendicular to each other;
a cam member formed with a slot-shaped protrusion fitting hole and rotatably held by the holder body
a follower shaft coupled to the base end of the shift lever; and
a shift-cable connection member formed with a slot-shaped shaft insertion hole and swingably held by the holder section, the shift-cable connection member being adapted to be connectable with a selected one of a shift cable connected to an automatic transmission and a shift cable connected to a manual transmission,
wherein the follower shaft is formed to have a distal end connectable with a selection cable connected to the manual transmission, and inserted into the shaft insertion hole to allow the distal end to protrude from the shaft insertion hole, in such a manner that the follower shaft is swingingly moved in conjunction with a tilt movement of the shift lever in the first direction to press an inner surface of the shift-cable connection member defining the shaft insertion hole so as to swingingly move the shift-cable connection member, and the follower shaft being moved inside and along the slot-shaped shaft insertion hole in conjunction with a tilt movement of the shift lever in the second direction, and
the base end of the shift lever includes a spherical portion having a protrusion which is fittingly inserted into the slot shaped protrusion fitting hole of the cam member movably in a lengthwise direction of the protrusion fitting hole, in such a manner that the protrusion is moved to press an inner surface of the protrusion fitting hole in conjunction with a rotation of the spherical portion in the first direction so as to rotate the cam member, and moved inside the protrusion fitting hole in a lengthwise direction of the protrusion fitting hole, in conjunction with a rotation of the spherical portion in the second direction.

2. The shifter as defined in claim 1, which further comprises:
a slider which is movable relative to the shift lever in an axial direction of the shift lever; and
a bias member biasing the slider,
wherein the holder section has a slide surface located in opposed relation to the slider to allow the slider to be slidingly moved therealong, the slide surface having a plurality of concave portions each depressed relative to the slide surface at a different position where the slider is located when the shift lever is set in a respective one of a plurality of shift positions, in such a manner that the slider is fitted into each of the concave portions under a biasing force of the bias member, when the shift lever is manually moved and set in a corresponding one of the shift positions.

3. The shifter as defined in claim 1, wherein the shift lever and the follower shaft are coupled so that an axis of the shift lever and an axis of the follower shaft intersect to define a plane, the second direction being substantially perpendicular to the plane defined by the axes of the shift lever and the follower shaft.

4. The shifter as defined in claim 3, wherein the axis of the shift lever and the axis of the follower shaft intersect at an angle greater than 90°.

5. The shifter as defined in claim 4, wherein the first and second directions are substantially perpendicular to the axis of the shift lever.

6. A shifter for use with a vehicle transmission, comprising:
a shift lever having a base end;
a holder section which holds the base end of the shift lever rotatably in first and second directions perpendicular to each other;
a follower shaft coupled to the base end of the shift lever so that an axis of the shift lever and an axis of the follower shaft intersect at an angle greater than 90° to define a plane, the second direction being substantially perpendicular to the plane defined by the axes of the shift lever and the follower shaft; and
a shift-cable connection member formed with a slot-shaped shaft insertion hole and swingably held by the holder section, the shift-cable connection member being adapted to be connectable with a selected one of a shift cable connected to an automatic transmission and a shift cable connected to a manual transmission,
wherein the follower shaft is formed to have a distal end connectable with a selection cable connected to the manual transmission, and inserted into the shaft insertion hole to allow the distal end to protrude from the shaft insertion hole, in such a manner that the follower shaft is swingingly moved in conjunction with a tilt movement of the shift lever in the first direction to press an inner surface of the shift-cable connection member defining the shaft insertion hole so as to swingingly move the shift-cable connection member, and the follower shaft being moved inside and along the slot-shaped shaft insertion hole in conjunction with a tilt movement of the shift lever in the second direction.

7. The shifter as defined in claim 6, wherein the first and second directions are substantially perpendicular to the axis of the shift lever.

* * * * *